US008561500B2

(12) United States Patent
D'Aluisio

(10) Patent No.: US 8,561,500 B2
(45) Date of Patent: Oct. 22, 2013

(54) BICYCLE WITH BEARING PRELOAD MECHANISM

(75) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 327 days.

(21) Appl. No.: 13/087,019

(22) Filed: Apr. 14, 2011

(65) Prior Publication Data

US 2012/0260767 A1 Oct. 18, 2012

(51) Int. Cl.
*B62M 3/00* (2006.01)
*F16C 33/66* (2006.01)
*F16C 13/00* (2006.01)

(52) U.S. Cl.
USPC .......... 74/594.1; 74/594.2; 384/517; 384/545

(58) Field of Classification Search
USPC ........... 74/594.1, 594.2, 594.3; 384/517, 538, 384/541, 545, 556, 563, 585
IPC ...................................................... B62K 19/34
See application file for complete search history.

(56) References Cited

U.S. PATENT DOCUMENTS

| | | | |
|---|---|---|---|
| 400,098 A | 3/1889 | Marlin | |
| 621,582 A | 3/1899 | Price | |
| 645,574 A | 3/1900 | Sidwell | |
| 3,816,013 A * | 6/1974 | Schuhmann | 403/368 |
| 3,919,898 A | 11/1975 | Sugino | |
| 4,563,099 A | 1/1986 | Brandenstein et al. | |
| 4,613,240 A * | 9/1986 | Hagelthorn | 384/585 |
| 4,887,919 A * | 12/1989 | Hamblin | 384/562 |
| 4,961,654 A | 10/1990 | Pangburn et al. | |
| 5,529,403 A * | 6/1996 | Martinie | 384/585 |
| 5,540,457 A | 7/1996 | Johnson | |
| 5,544,905 A | 8/1996 | Chen | |
| 5,597,242 A * | 1/1997 | Beeler | 384/517 |
| 6,604,886 B2 | 8/2003 | Kinzler et al. | |
| 7,186,030 B2 | 3/2007 | Schlanger | |
| 7,258,637 B2 | 8/2007 | Thomasberg | |
| 7,607,507 B2 | 10/2009 | Lane et al. | |
| 2006/0029317 A1 | 2/2006 | Yamamoto | |
| 2007/0017318 A1* | 1/2007 | French | 74/594.1 |
| 2007/0052201 A1 | 3/2007 | Hermansen et al. | |
| 2007/0295154 A1* | 12/2007 | D'Aluisio et al. | 74/594.1 |

FOREIGN PATENT DOCUMENTS

GB 2120360 A * 11/1983

* cited by examiner

*Primary Examiner* — Thomas R Hannon
*Assistant Examiner* — Adam D Rogers
(74) *Attorney, Agent, or Firm* — Michael Best & Friedrich LLP

(57) ABSTRACT

A crankset for a bicycle that includes a first crank, a second crank, a spindle, a bearing, and a preload mechanism. Each of the first crank and the second crank has an end adapted to engage a pedal. The spindle defines an axis and includes a first end that is coupled to the first crank and a second end that is coupled to the second crank. The bearing positioned around the spindle between the first crank and the second crank to permit rotation of the spindle. The preload mechanism is coupled to the spindle between the bearing and the first crank. The preload mechanism includes a washer that extends circumferentially around the spindle and a cam member that is engageable with the washer to move the washer along the axis to preload the bearing.

15 Claims, 5 Drawing Sheets

BICYCLE WITH BEARING PRELOAD MECHANISM

BACKGROUND

The present invention relates to bicycles, and more particularly to a bearing preload mechanism for bicycles.

Typically, bicycles are propelled by pedals mounted to a crankset at opposite ends of a spindle. A typical crankset is equipped with two cranks that each supports a pedal at one end and couples with a spindle adjacent the other end. The spindle is supported for rotation within a bottom bracket of a bicycle frame by bearings. These cranksets transfer energy exerted on the pedals by a rider to forward motion of the bicycle. The crankset typically includes one or more sprockets that engage a chain to transfer the rotary motion of the crankset to a rear wheel.

Existing cranksets commonly rely on one or more wave washers to preload/limit or adjust end play of the bearings in the crankset. These washers are used in part because there is limited space available adjacent the bearings. However, the preload provided by these wave washers is inconsistent and the quantity of washers needed to adequately preload the bearing varies for each crankset due to various tolerances within the crankset. Adequately preloading the bearing with these washers requires an iterative process that often necessitates assembly and disassembly of the crankset numerous times until the correct quantity of washers is determined.

SUMMARY

In some constructions, the present invention provides a crankset for a bicycle that includes a first crank and a second crank each having an end adapted to engage a pedal. The crankset also includes a spindle, a bearing, and a preload mechanism. The spindle defines an axis and includes a first end that is coupled to the first crank and a second end that is coupled to the second crank. The bearing positioned around the spindle between the first crank and the second crank. The preload mechanism is coupled to the spindle between the bearing and the first crank. The preload mechanism includes a washer that extends circumferentially around the spindle and a cam member that is engageable with the washer to move the washer along the axis to preload the bearing.

In another construction, a crankset for a bicycle that includes a first crank and a second crank each having an end adapted to engage a pedal. The crankset also includes a spindle, a bearing, and a preload mechanism. The spindle defines an axis and includes a first end that is coupled to the first crank and a second end that is coupled to the second crank. The bearing is positioned around the spindle between the first crank and the second crank to permit rotation of the spindle. The preload mechanism is coupled to the spindle between the bearing and the first crank, and the preload mechanism includes a cover, a washer at least partially enclosed by the cover and engageable with the bearing, and a cam member adjustably coupled to the cover to engage and load the washer such that the washer is engaged with and preloads the bearing.

In another construction, the invention provides a bicycle including an axle that defines an axis, a bearing that is positioned around the axial to permit rotation of the axle, and a preload mechanism that is coupled to the axle adjacent the bearing. The preload mechanism includes a cover, a cam member threadably coupled to the cover, and a washer engageable by the cam member and movable into engagement with the bearing along the axis to preload the bearing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
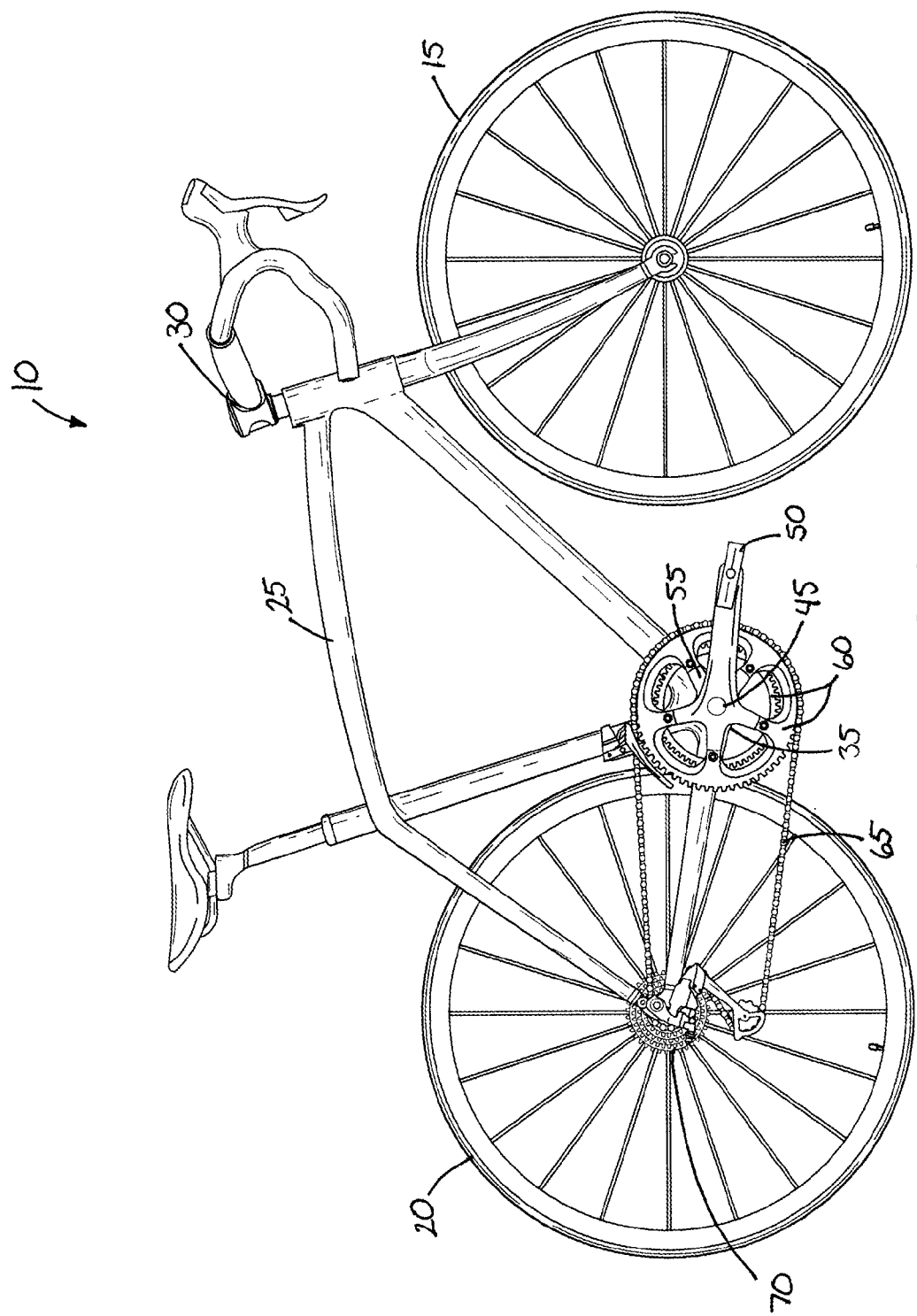
FIG. 1 is a side view of a bicycle including a crankset embodying the present invention.
Figure 2:
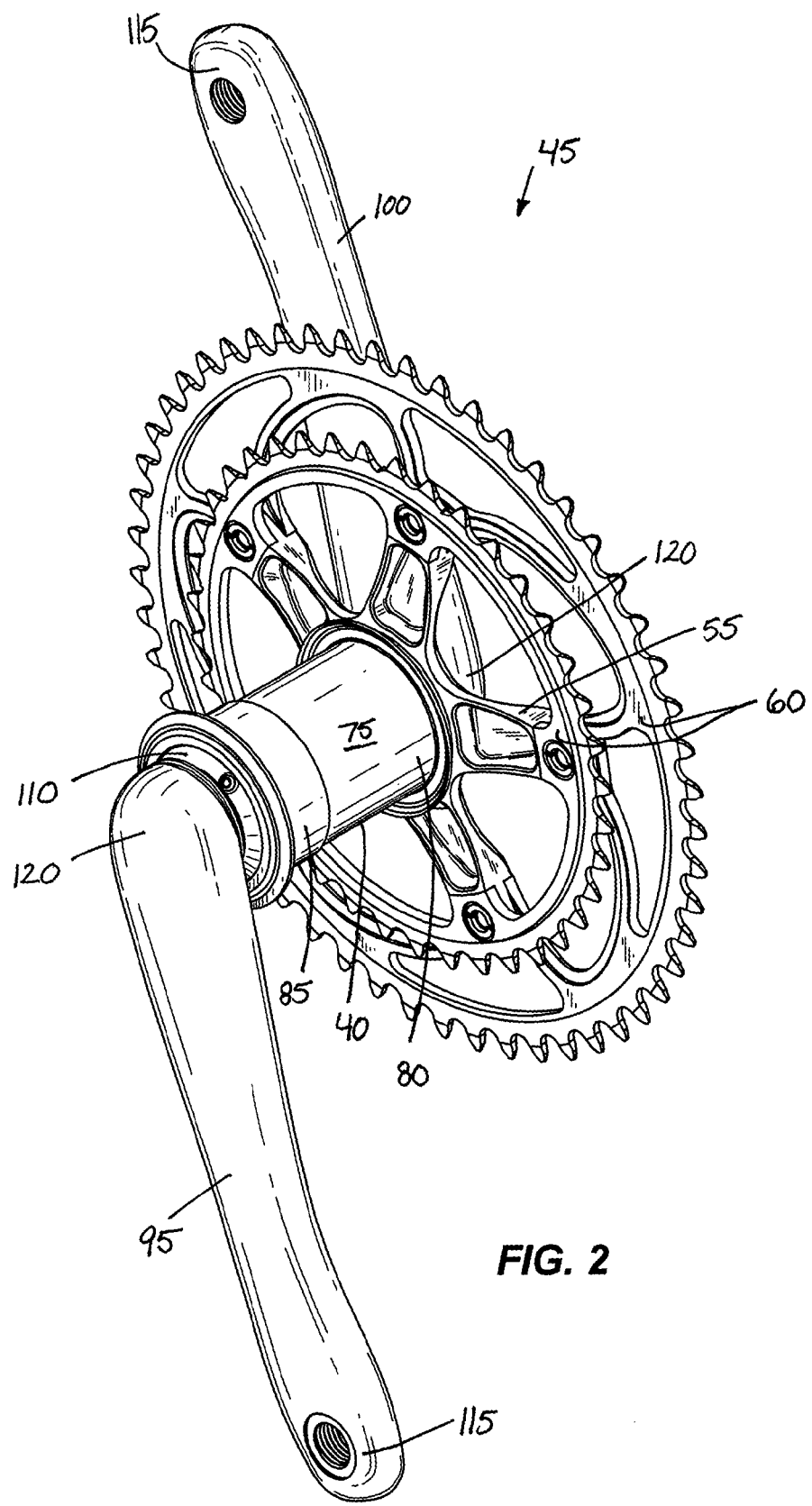
FIG. 2 is a perspective view of the crankset of FIG. 1.

FIG. 1 illustrates a bicycle 10 that includes a front wheel 15, a rear wheel 20, a frame 25, and a steering assembly 30. The frame 25 includes a bottom bracket 35 defining an opening (not shown) that receives a bottom bracket shell 40 (see FIG. 2). The frame 25 is formed from a carbon material or other similar materials with adequate strength properties. FIG. 2 shows a crankset 45 that couples to the shell 40. With reference to FIG. 1, pedals 50 are attached to the crankset 45 to allow a user to rotate the crankset 45 and to propel the bicycle 10, as is known in the art. A sprocket assembly 55 is coupled to the crankset 45 and may include one or more chain rings 60 that couple to a chain 65. The chain 65 engages the rear wheel 20 through a series of rear sprockets 70.

FIG. 2 shows that the shell 40 is defined by a cylindrical outer surface 75 that fits within the bottom bracket 35 to adequately secure the shell 40 within the opening of the bottom bracket 35. The shell 40 is bonded or otherwise adhered to the bottom bracket 35 with an epoxy or other adhesive to inhibit rotation of the shell 40 within the bottom bracket 35. The illustrated shell 40 is formed from aluminum first and second pieces 80, 85. The two pieces 80, 85 are bonded to each other using an adhesive to limit rotation of one of the pieces 80, 85 relative to the other of the pieces 80, 85. Other constructions of the shell 40 may be formed from steel or other material (e.g., titanium, carbon fiber, etc.). Still other constrictions of the shell 40 may be formed from a single piece or more than two pieces.

Each of the first and second pieces 80, 85 defines a bearing surface 87 (FIG. 5) that receives a bearing 90. The bearings 90 are disposed and lightly pressed within the shell 40 in contact with the bearing surfaces 87 to support rotation of the crankset 45. As shown in FIG. 6, the bearings 90 are cartridge bearings that include an inner race 92, ball bearings 93, and an outer race 94, although other bearings could be used instead (e.g., cone bearings, etc.). Retaining clips (not shown) can be provided within the shell 40 on an inward side of each of the bearings 90 to inhibit movement of the bearings 90 toward a center of the shell 40.

The crankset 45 includes a first crank 95, a second crank 100, a spindle 105, and a preload mechanism 110. Each of the first crank 95 and the second crank 100 includes a first or free end 115 and a second end 120 that is coupled to the spindle 105.

Figure 3:
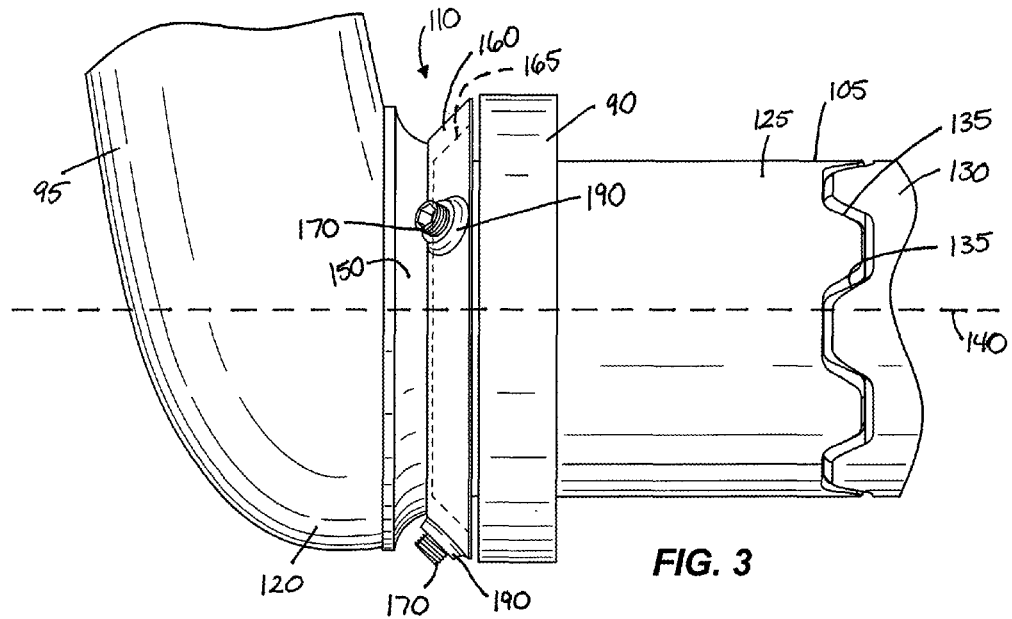
FIG. 3 is a front view of a portion of the crankset of FIG. 1 including a preload mechanism in an unloaded state.
Figure 4:
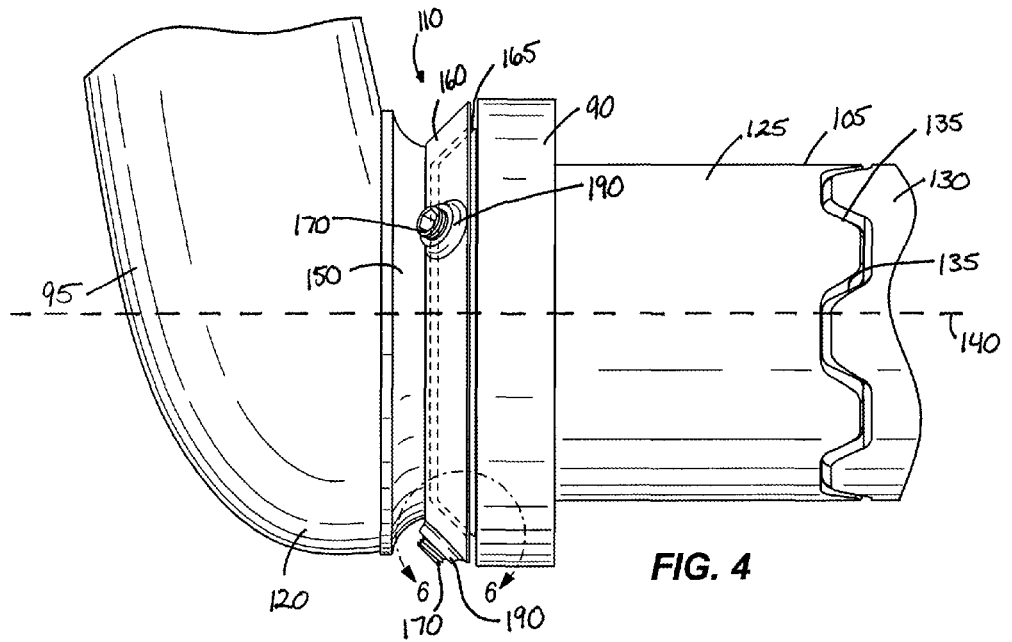
FIG. 4 is a front view of a portion of the crankset of FIG. 1 including the preload mechanism in a preloaded state.
Figure 5:
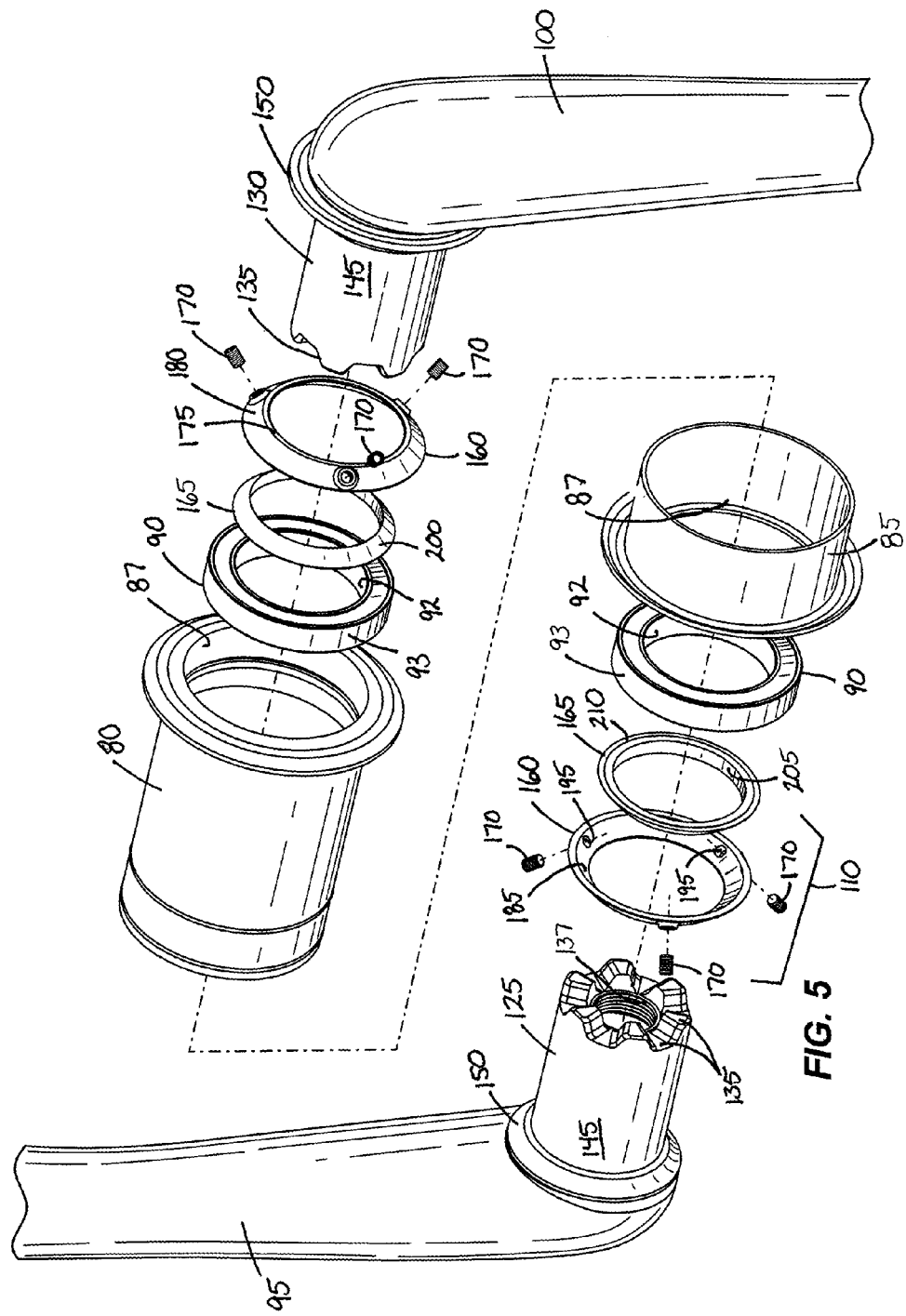
FIG. 5 is an exploded perspective view of a portion of the crankset of FIG. 2.
Figure 6:
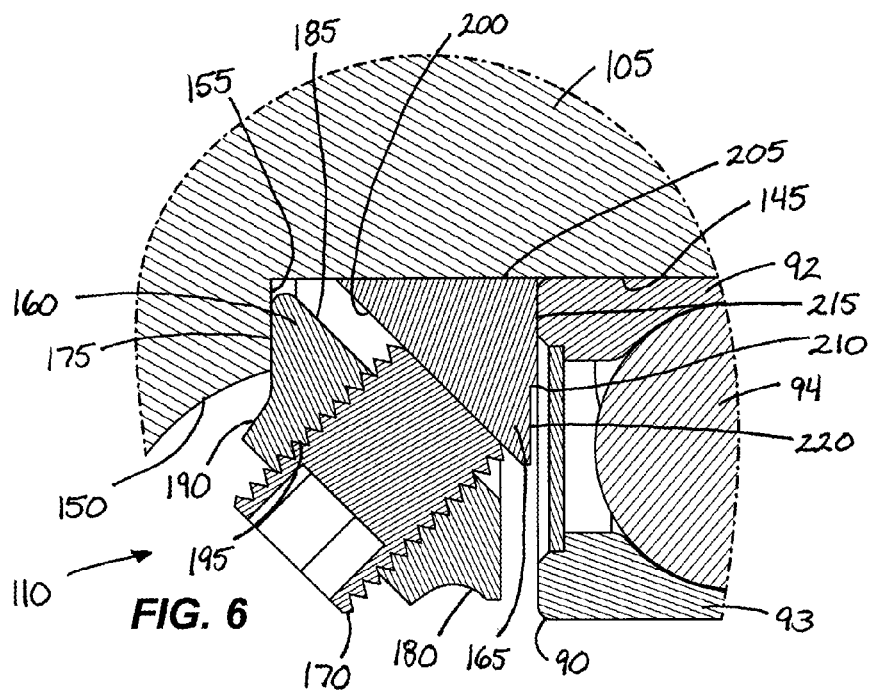
FIG. 6 is a section view of a portion of the crankset of FIG. 4 taken at line 6-6.

FIGS. 3, 4, and 5 show that the spindle 105 is a two-piece spindle that has a first spindle portion 125 coupled to the first crank 95, and a second spindle portion 130 coupled to the second crank 100. In some constructions, the spindle 105 can be formed from a single unitary body. In the illustrated construction, the first spindle portion 125 and the second spindle portion 130 are coupled to each other near the center of the spindle 105 by cooperative engagement mechanisms 135 (e.g., protrusions or teeth, and cavities disposed between the teeth). A hollow bolt (not shown) can be used to further secure the first and second spindle portions 125, 130 to each other (e.g., by threaded engagement of the attachment device with a hole 137 in the first spindle portion 125 (see FIG. 5)). The spindle 105 (e.g., the first and second spindle portions 125, 130) can be formed from metal (e.g., titanium, steel, aluminum, etc.), from a metal alloy, or other durable composites.

The spindle 105 rotates about an axis 140 (FIGS. 3 and 4) and defines bearing surfaces 145 adjacent both ends of the spindle 105. As shown in FIG. 2, the sprocket assembly 55 is attached to the end of the spindle 105 nearest the second crank 100. The spindle 105 includes flanges 150 that are coupled to the first and second cranks 95, 100 (e.g., by adhesive, welding, press fit, etc.) to secure the first and second cranks 95, 100 to the spindle 105. With reference to FIG. 6, each flange 150 defines a shoulder 155 adjacent the respective bearing surfaces 145.

As shown in FIGS. 3 and 4, the preload mechanism 110 is coupled to the spindle 105 between one of the bearings 90 and the first crank 95. As shown in FIG. 5, another preload mechanism 110 (see FIG. 5) can be coupled to the spindle 105 between the other bearing 90 and the second crank 100. The structure, assembly, and function of the second preload mechanism 110 are the same as the structure, assembly, and function of the first preload mechanism 110 between the bearing 90 and the first crank 95. As such, only the preload mechanism 110 between the bearing 90 and the first crank 95 will be described in detail.

Figure 7:
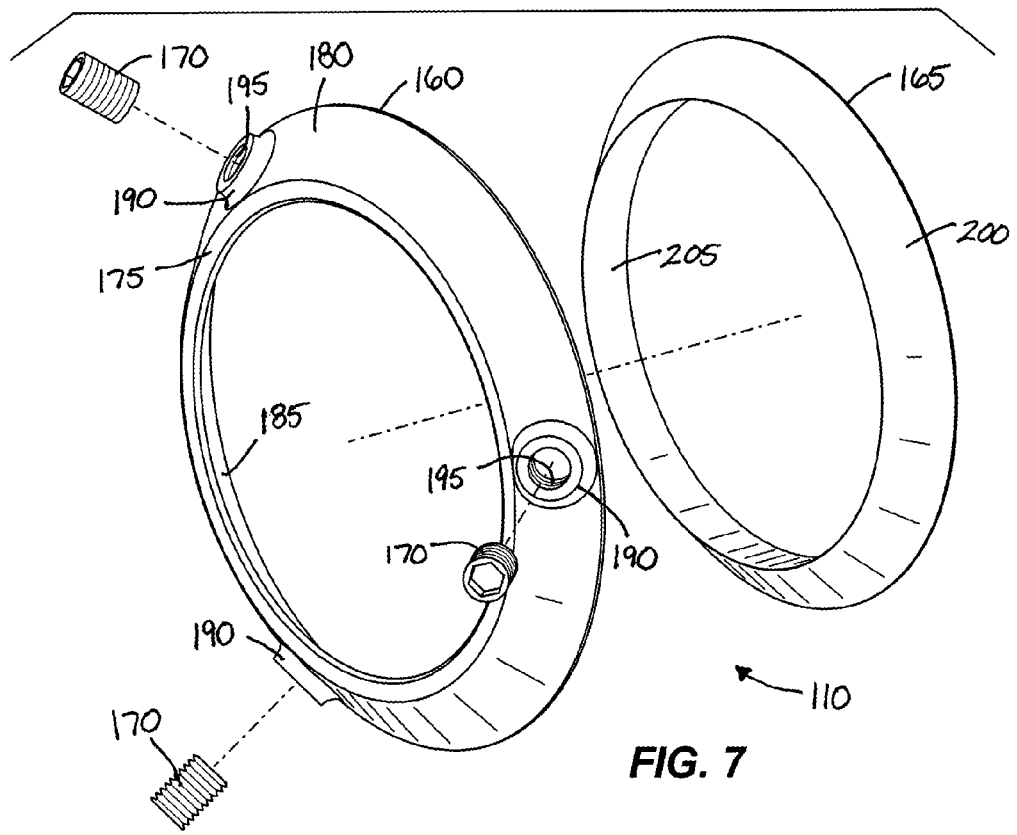
FIG. 7 is an exploded perspective view of the preload mechanism of FIG. 3.

FIGS. 3-7 show that the preload mechanism 110 includes a cover 160, a washer 165, and cam members 170 passing through the cover 160 and engageable with the washer 165 to adjust the preload the corresponding bearing 90. The cover 160 is disposed on and extends circumferentially around the spindle 105 to at least partially enclose the washer 165. As illustrated in FIGS. 5-7, the cover 160 is defined by a hollow frustoconical-shaped ring that has a flange engagement surface 175, an outer surface 180, and an inner surface 185 substantially opposite the outer surface 180. The cover 160 is sized such that it is slightly larger than the spindle 105. The flange engagement surface 175 is engageable with the shoulder 155 on the flange 150 to limit movement of the cover away from the bearing 90.

Protrusions or bosses 190 extend outward from the outer surface 180, and threaded holes 195 extend through the bosses 190 and the cover 160 to the inner surface 185. The bosses 190 provide a thicker cross-sectional area for defining the threaded holes 195. In some constructions, the cover 160 can be provided without the bosses 190 (e.g., by providing a thicker cover, etc.). As illustrated, the cover 160 includes three bosses 190 and holes 195 corresponding to the quantity of cam members 170. In other constructions the cover 160 can include fewer or more than three holes 195 based on the desired quantity of contact points with the washer 165.

The washer 165 is disposed on and extends circumferentially around the spindle 105. The washer 165 is defined by a hollow frustoconical-shaped ring that has a cam surface 200, an inner surface 205, and a bearing engagement portion 210. The washer 165 is unloaded when the cam members 170 are not engaged with the cam surface 200, and the washer 165 is loaded when the cam members 170 are engaged with the cam surface 200. The washer 165 is substantially nested in the cover 160 adjacent the inner surface 185 such that the cam surface 200 can contact the inner surface 185 of the cover 160 when the washer 165 is unloaded. As shown in FIG. 6, the cam surface 200 is spaced apart from the inner surface 185 when the washer 165 is loaded by the cam members 170. The preload mechanism 110 has a very low stack height with the washer 165 substantially nested in the cover 160.

The inner surface 205 is an annular surface disposed adjacent the spindle 105. As illustrated in FIG. 6, the bearing engagement portion 210 has a first surface 215 that is engageable with the inner race 92 of the bearing 90 and a second surface 220 that is recessed relative to a plane defined by the first surface 215. The bearing engagement portion 210 provides a contact point (the first surface 215) between the washer 165 and the bearing 90 while avoiding interference with the side of the bearing 90 when the crankset 45 is in motion.

The cam members 170 are engaged with the cover 160 within the holes 195. The cam members 170 are engageable adjacent the first end by a tool (e.g., Allen wrench, screwdriver, etc.) to engage and push or move the washer 165 along the axis 140 to engage and preload the bearing 90. As illustrated, the cam members 170 are cylindrical fasteners that can be threaded into the holes 195 to protrude beyond the inner surface 185 of the cover 160 to engage the cam surface 200 of the washer 165. In other constructions, the cam members 170 can be engaged with and movable relative to the cover 160 by other suitable attachment means. The illustrated construction of the crankset includes three cam members 170 that are equally spaced around the cover 160, although fewer or more than three cam members 170 can be provided in equal or different intervals around the cover 160.

The illustrated crankset 45 is assembled by placing the cover 160 on the first spindle portion 125 adjacent the flange 150, and then nesting the washer 165 in the cover 160 on the first spindle portion 125. The bearings 90 are press fit into the shell 40 in communication with the bearing surfaces 87 adjacent the ends of the shell 40. The first spindle portion 125 is then disposed in one side of the shell 40 and the second spindle portion 130 is disposed in the other side of the shell 40 so that the bearing surfaces 145 of the spindle 105 are engaged with the bearings 90, and so that the bearings 90 are located adjacent the washers 165 of the respective preload mechanisms 110. The first spindle portion 125 and the second spindle portion 130 are coupled together by the hollow bolt to rotatably secure the first spindle portion 125 to the second spindle portion 130 within the bottom bracket 35. The cam members 170 can be coupled to the cover 160 before or after the cover 160 is assembled onto the spindle 105.

When the crankset 45 is first assembled, the preload mechanism 110 is in an unloaded state where the cover 160 and the washer 165 can "float" a short distance between the flange 150 and the bearing 90. In other words, the cam members 170 are not engaged with the washer 165 to push the washer 165 into engagement with the bearing 90 when the preload mechanism 110 is in the unloaded state.

As shown in FIGS. 4 and 5, the preload mechanism 110 can be moved from the unloaded state to a preloaded state by threading the cam members 170 into and through the cover 160 to engage the washer 165. Specifically, the cam members 170 are threaded through the holes 195 to engage the cam surface 200 and push or move (i.e., load) the washer 165 along the axis 140. Movement of the washer 165 along the axis 140 engages the bearing engagement portion 210 with the inner race 92 of the bearing 90. The force provided by the bearing engagement portion 210 in response to movement of the washer 165 preloads the bearing 90. Stated another way, the cam members 170 engage the cam surface 200 to load and move the washer 165, which in turn preloads the bearing 90 when the bearing engagement portion 210 engages the bearing 90.

In the preloaded state, the cover 160 is engaged with the shoulder 155 of the flange 150 and the bearing engagement portion 210 is engaged with the bearing 90. The shoulder 155 acts as a leverage point for the preload mechanism 110 to act on and preload the bearing 90. The cam members 170 are adjustable relative to the cover 160 and act on the frustoconical or angled cam surface 200 to push the washer 165 toward the bearing 90 while also forcing the cover 160 into the shoulder 155 on the flange 150 due to the limited space between the bearing 90 and the flange 150. The adjustable cam members 170 provide minute adjustment of the force acting on the bearing 90 via the washer 165 to achieve the desired preload on the bearing 90 consistently and without repeated assembly and disassembly of the crankset 45.

Although the preload mechanism 110 is illustrated and described with regard to adjusting the preload of the bearings 90 in the crankset 45, the preload mechanism 110 can also be used to adjust the preload of bearings associated with other parts of the bicycle 10. For example, the preload mechanism 110 can be used to preload bearings in an axle of the front wheel 15, an axle of the rear wheel 20, or within the steering assembly 30 (e.g., between a head tube and a steerer tube of the steering assembly 30) to achieve the desired preload on the corresponding bearings.

Various features and advantages of the invention are set forth in the following claims.

What is claimed is:

1. A crankset for a bicycle, the crankset comprising:
   a first crank and a second crank, each of the first crank and the second crank having an end adapted to engage a pedal;
   a spindle defining an axis and including a first end coupled to the first crank and a second end coupled to the second crank;
   a bearing positioned around the spindle between the first crank and the second crank; and
   a preload mechanism coupled to the spindle between the bearing and the first crank, the preload mechanism including a washer extending circumferentially around the spindle and at least one cam member engageable with the washer to move the washer along the axis to preload the bearing, the preload mechanism further including a cover at least partially enclosing the washer, wherein the at least one cam member is adjustable relative to the cover to load the washer, and
   wherein the cover is engaged with a shoulder on the first crank when the washer is engaged with the bearing.

2. The crankset of claim 1, wherein the cover has a hole and the at least one cam member is threaded through the hole.

3. The crankset of claim 2, wherein the at least one cam member includes three cam members equally spaced apart from each other along a circumference of the cover and engageable with the washer through corresponding holes in the cover.

4. The crankset of claim 1, wherein the washer has a cam surface defined by a substantially frustoconical shape.

5. A crankset comprising:
   a first crank and a second crank, each of the first crank and the second crank having an end adapted to engage a pedal;
   a spindle including a first end coupled to the first crank and a second end coupled to the second crank;
   a bearing positioned around the spindle between the first crank and the second crank to permit rotation of the spindle; and
   a preload mechanism coupled to the spindle between the bearing and the first crank, the preload mechanism including a cover, a washer at least partially enclosed by the cover and engageable with the bearing, and a cam member adjustably coupled to the cover to engage and load the washer such that the washer is engaged with and preloads the bearing, and
   wherein the cover is engaged with a shoulder on the first crank when the washer is engaged with the bearing.

6. The crankset of claim 5, wherein the washer is moved along an axis into engagement with the bearing in response to loading by the cam member.

7. The crankset of claim 5, wherein the cover has a hole and the cam member is threadably coupled to the cover within the hole.

8. The crankset of claim 5, wherein the washer has a cam surface extending partially around the washer such that the washer is defined by a substantially frustoconical shape.

9. The crankset of claim 5, wherein the washer extends circumferentially around the spindle.

10. A bicycle comprising:
    a crankset having a crank and a spindle coupled to the crank, the spindle defining an axle having an axis;
    a bearing positioned around the axle to permit rotation of the axle; and
    a preload mechanism coupled to the axle adjacent the bearing, the preload mechanism including a cover, a cam member threadably coupled to the cover, and a washer engageable by the cam member and movable into engagement with the bearing along the axis to preload the bearing, and
    wherein the cover is engaged with a shoulder disposed on the crank when the washer is engaged with the bearing.

11. The bicycle of claim 10, wherein the washer extends circumferentially around the axle.

12. The bicycle of claim 10, wherein the cover at least partially encloses the washer, and wherein the cam member is adjustable relative to the cover to load the washer.

13. The bicycle of claim 12, wherein the cover has a hole and the cam member is threadably coupled to the cover within the hole.

14. The bicycle of claim 10, wherein the washer has a cam surface extending partially around the washer such that the washer is defined by a substantially frustoconical shape.

15. The bicycle of claim 10, wherein the preload mechanism is coupled to the axle between the crank and the bearing.

* * * * *